(12) United States Patent
Mäkinen

(10) Patent No.: US 7,437,183 B2
(45) Date of Patent: *Oct. 14, 2008

(54) WIRELESS USER INTERFACE EXTENSION

(75) Inventor: Rauno Mäkinen, Tampere (FI)

(73) Assignee: Nokia Corporation, Espoo (FI)

( * ) Notice: Subject to any disclaimer, the term of this patent is extended or adjusted under 35 U.S.C. 154(b) by 385 days.

This patent is subject to a terminal disclaimer.

(21) Appl. No.: 10/184,403

(22) Filed: Jun. 26, 2002

(65) Prior Publication Data

US 2003/0003892 A1 Jan. 2, 2003

(30) Foreign Application Priority Data

Jun. 29, 2001 (FI) .................................. 20011415

(51) Int. Cl.
*H04B 1/38* (2006.01)
*H04M 1/00* (2006.01)
*G05B 19/00* (2006.01)
*G05B 23/00* (2006.01)
*B60R 25/10* (2006.01)

(52) U.S. Cl. .............. 455/569.1; 455/569.2; 455/575.9; 455/90.3; 340/426.13; 340/5.61

(58) Field of Classification Search ................ 455/41.2, 455/41.3, 556.1, 556.2, 569.1, 569.2, 575.9, 455/414.1; 340/426.1, 426.13, 426.35, 426.36, 340/5.61, 5.72

See application file for complete search history.

(56) References Cited

U.S. PATENT DOCUMENTS

| | | | |
|---|---|---|---|
| 5,613,215 A * | 3/1997 | Grube et al. ................. | 340/7.22 |
| 6,069,411 A | 5/2000 | Charron ..................... | 370/10.5 |
| 6,388,558 B1 * | 5/2002 | Emmei ........................ | 340/5.2 |
| 6,466,786 B1 * | 10/2002 | Wallenius .................... | 455/433 |
| 6,542,758 B1 * | 4/2003 | Chennakeshu et al. ... | 455/569.2 |
| 6,697,638 B1 * | 2/2004 | Larsson et al. ........... | 455/553.1 |
| 6,748,536 B1 * | 6/2004 | Madau ........................ | 713/193 |

FOREIGN PATENT DOCUMENTS

| | | |
|---|---|---|
| DE | 100 43 918 | 3/2001 |
| DE | 100 64 546 | 4/2002 |
| EP | 1 052 834 | 11/2000 |
| WO | WO 01/11896 A2 | 2/2001 |
| WO | WO 01/40605 A1 | 6/2001 |

OTHER PUBLICATIONS

Haartsen, J., "Bluetooth—The Universal Radio Interface for ad hoc, Wireless Connectivity", Ericsson Review No. 3, Stockholm, Sweden, 1998, pp. 110-117.

* cited by examiner

*Primary Examiner*—George Eng
*Assistant Examiner*—Un C Cho
(74) *Attorney, Agent, or Firm*—Harrington & Smith, PC

(57) ABSTRACT

A car hands-free unit (HFU 140) with a Low-Power Radio-Frequency (LPRF) module 141 (typically a Bluetooth module) configured to receive an identifier 134 from a car key 133. Different drivers are provided with different car keys 133. When receiving the identifier 134 first time, the HFU stores trusted data to pair with a driver's phone. Thereafter, the HFU automatically connects to the driver's phone when the same car key 133 is used. The hands-free unit typically comprises a microphone and a loudspeaker, and can also have a display and/or a camera. In operation the HFU provides automatic link 160 with a compliant LPRF enabled mobile phone without need to touch the mobile phone, allowing its use even when the mobile phone is placed in a boot of a car 101.

16 Claims, 3 Drawing Sheets

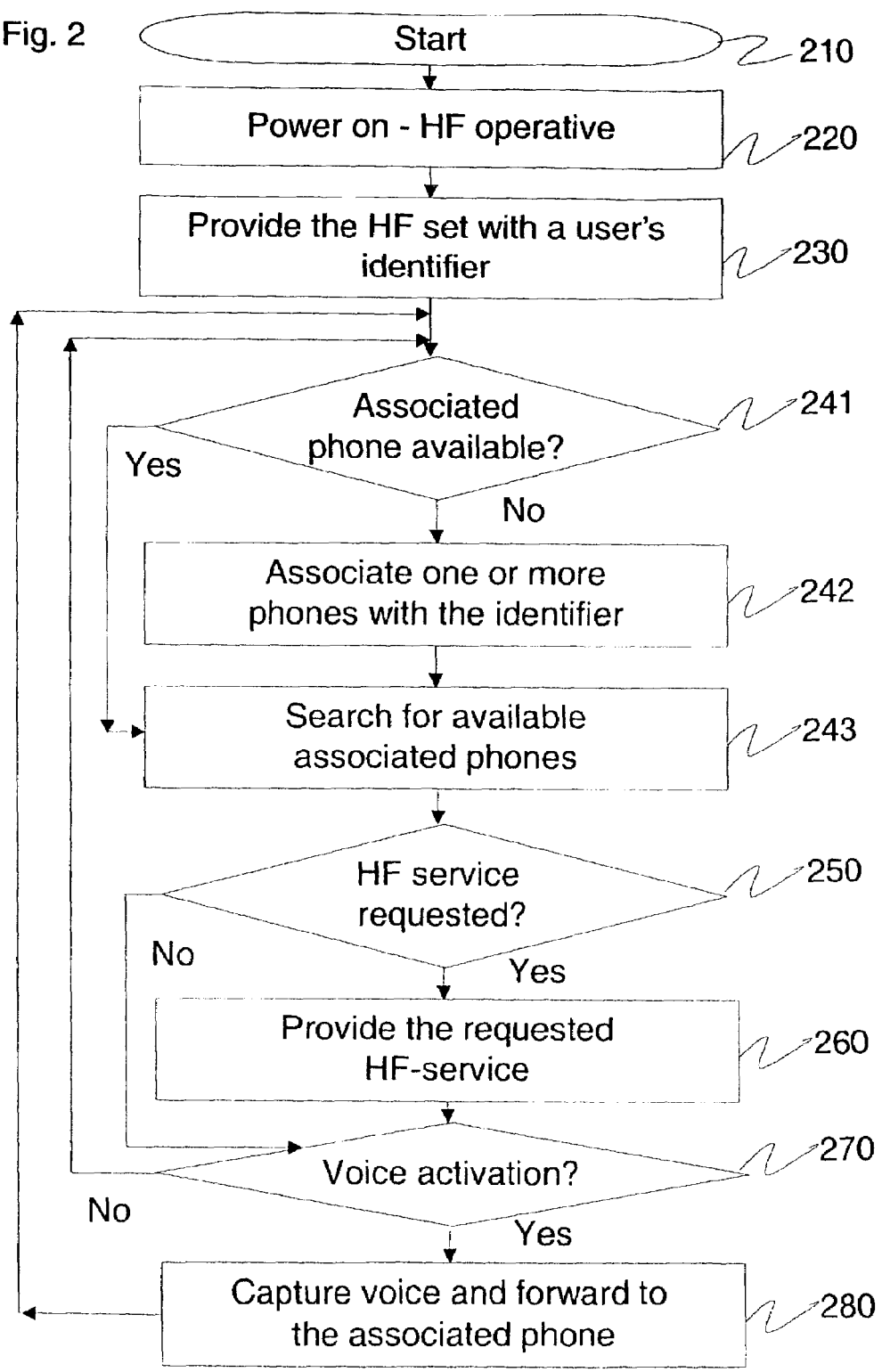

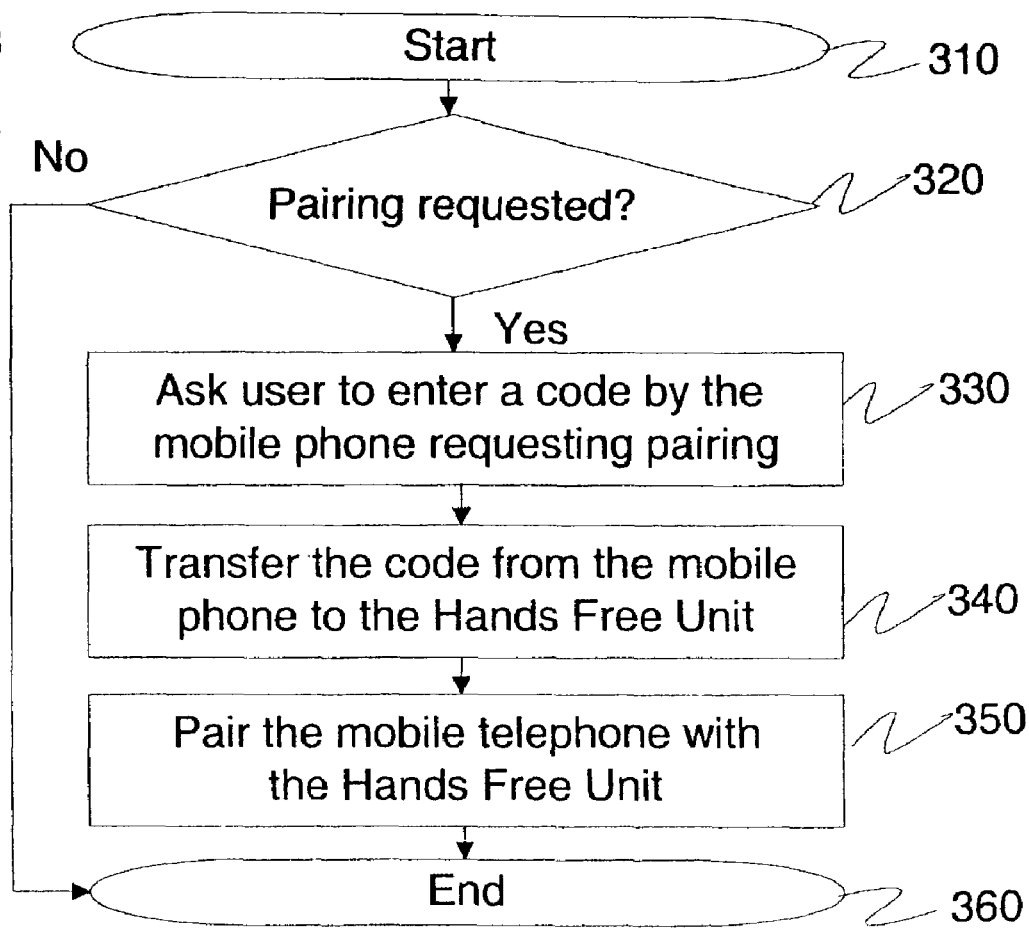

WIRELESS USER INTERFACE EXTENSION

FIELD OF THE INVENTION

This invention relates to wireless hands-free (HF) equipment of mobile telephones. It relates particularly, but not exclusively, to vehicle-installable wireless HF equipment for mobile telephones.

BACKGROUND OF THE INVENTION

Various accessories have been developed for mobile telephones to improve their usability. One of these is an HF set for a car that has a cradle for receiving a mobile telephone. The cradle comprises an interface for charging the mobile telephone and another interface for coupling an external speaker and microphone (HF equipment) to the mobile telephone when placed in the cradle. This enables the HF operation and easy charging of the mobile telephone. More recently, the talk and standby times of mobile telephones have increased so that charging is not usually required during a car journey. Therefore, many individuals have considered HF sets to be unnecessary in car. However, if a mobile telephone is kept in a pocket or attached to a belt, answering mobile telephone calls can be inconvenient.

Wireless Bluetooth HF-sets have been developed to provide an easy connection of a mobile telephone with the HF-set. A mobile telephone brought into a car can connect to the HF-set from a pocket or a briefcase by means of Low-Power Radio Frequency (LPRF) waves. For example, Parrot has presented in their press release a Bluetooth enabled car HF set Parrot CK3000. According to the press release, this kit is based on Parrot's technology and powered by Parrot's Chip "Parrot3", which provides voice recognition. The user can place a call with his phone in his pocket or briefcase.

SUMMARY OF THE INVENTION

According to a first aspect of the present invention, there is provided a method of extending a user interface of a mobile communication device by means of a user interface extension device which is configured for vehicle use, the mobile communication device and the user interface extension device communicating over a wireless link, the method comprising:

storing, accessible to the user interface extension device, trusted relationship information for connecting to the mobile communication device over the wireless link;

characterised by the method further comprising the steps of:
obtaining an authorisation code to use a vehicle;
obtaining an identifier having a common source as the authorisation code;
identifying by the identifier a particular mobile communication device; and
using the identifier to establish the wireless link between the user interface extension device and a particular mobile communication device.

It is advantage of the invention that trusted relationship information can be stored and later used easily so as to make use of a presently available mobile communication device automatically without necessarily requiring user interaction.

Preferably, the trusted relationship information corresponds to the identifier.

Preferably, the method further comprises the step of using the trusted relationship information corresponding to the identifier to connect the user interface extension device with the mobile communication device selected. This allows forming of a relatively secure link with the mobile communication device.

Preferably, the identifier is derived from the authorisation code. Alternatively, the identifier is identical to the authorisation code.

Preferably, the authorisation code is a code derived from a physical entity. Preferably, the physical entity is a mechanical key, an electronic key, a retinal pattern of the user, a finger print of the user, or the voice of the user. Alternatively, the authorisation code is a code known by the user.

Preferably, the user interface extension device is connected with the particular mobile communication device in response to obtaining the identifier. This may provide the user interface extension device available to the particular mobile communication device without perceivable delays.

Alternatively, the user interface extension device is connected with the particular mobile communication device on an on-demand basis, for example on receiving a telephone call by the particular mobile communication device. This may provide the user interface extension device available to the particular mobile communication device without perceivable delays and without unnecessarily communicating radio signals and spares energy of the particular mobile communication device.

Preferably, the method further comprises associating the trusted relationship information with the identifier by the user interface extension device.

Preferably, the method further comprises the step of detecting a pairing request from a mobile communication device.

Preferably, the associating comprises a sub-step of storing the trusted relationship information in a memory of the user interface extension device. This allows automatic connection of the user interface extension device to an associated mobile telephone without necessarily performing the association again.

Preferably, the user interface extension device repeatedly broadcasts messages to indicate to any mobile communication device within its coverage that a user interface service is available.

Preferably, said storing trusted relationship information comprises a sub-step of storing the trusted relationship information in a memory of the mobile communication device. This helps in the forming of the trusted link.

Preferably, said storing trusted relationship information is suitable for use in a pairing process conforming to the Bluetooth standard. This provides conformance with a forthcoming extensive base of Bluetooth enabled mobile telephones.

Preferably, the user interface extension device comprises a loudspeaker. This allows hands-free conversations using the mobile communication device where the user interface extension device provides an audio signal to the user.

Preferably, the user interface extension device comprises a microphone. This allows hands-free conversations using the mobile communication device where the external user interface extension device captures an audio signal from the user.

Preferably, the user interface extension device comprises a speech synthesiser. This allows the user interface extension device to convert written information into speech to the user. This helps receiving written messages such as short messages known from the short message service in GSM.

Preferably, the user interface extension device comprises a display. This allows the user interface extension device to provide an external display for displaying information to the user, for example, maps, pictures, traffic signs.

Preferably, the user interface extension device comprises an electronic image capturing device. This allows hands-free video mobile telephone conversations where the user interface extension device captures images by the user.

Preferably, the image capturing device is manually controllable such that the user may determine the object of the capturing device. This allows the user to take electronic images of the environment, for example to help rescue people to determine which rescuing units are required in case of a traffic accident, or to ask advice for navigation, or just collect pictures from beautiful scenes.

Preferably, the method further comprises the step of detecting the authorisation code. Preferably, this detecting is based on checking the user's key. Even more preferably, at least two different keys are provided for different users so that those different users have an access to use the vehicle with different keys that provide different identifiers. This allows association of different mobile communication devices with different identifiers by the user interface extension device.

Preferably, the identifier is used to establish the wireless link between the user interface extension device and the particular mobile communication devices among at least two mobile communication devices.

Preferably, the method further comprises the step of keeping a database of identifiers and corresponding mobile communication devices. Preferably, the database is kept by the user interface extension device.

Preferably, the method further comprises the steps of obtaining a signal when the authorisation code becomes inaccessible to the vehicle.

Preferably, the method further comprises removing the wireless link between the user interface extension device and the particular mobile communication device in response to detecting the authorisation code becoming inaccessible to the vehicle.

Preferably, the method further comprises automatic transfer of user interface operation from the user interface extension device to the particular mobile communication device in response to detecting the authorisation code becoming inaccessible to the vehicle.

According to a second aspect of the present invention, there is provided a user interface extension device for extending a user interface of a mobile communication device, comprising:

a wireless transceiver for providing a wireless link between the user interface extension device and the mobile communication device;

at least one user interface element for providing the mobile communication device with an extended user interface; and a memory for storing trusted relationship information for connecting to the mobile communication device over the wireless link.

characterised by the user interface extension device further comprising a port for receiving an identifier having a common source as an authorisation code to use a vehicle, and for receiving an identifier having a common source as the authorisation code, the identifier identifying a particular mobile communication device; and the wireless transceiver being configured to establish the wireless link between the user interface extension device and a particular mobile communication device by using the identifier.

According to a third aspect of the present invention, there is provided a system comprising:

a mobile communication device comprising a wireless transceiver for forming a wireless link;

a user interface extension device comprising a wireless transceiver for providing a wireless link between the user interface extension device and the mobile communication device and at least one user interface element for providing the mobile communication device with an extended user interface; and a memory for storing, accessible to the user interface extension device, trusted relationship information for connecting the user interface extension device to the mobile communication device over the wireless link;

characterised by the system further comprising a port for receiving an identifier having a common source as an authorisation code to use a vehicle, the identifier identifying a particular mobile communication device; and the wireless transceiver being configured to establish the wireless link between the user interface extension device and a particular mobile communication device by using the identifier.

According to a fourth aspect of the present invention, there is provided a vehicle for a user having a mobile communication device and an authorisation code to use the vehicle, the vehicle comprising:

a user interface extension device configured for vehicle use;

a wireless transceiver for providing a wireless link between the user interface extension device and a mobile communication device;

at least one user interface element for providing the mobile communication device with an extended user interface; and a memory for storing, accessible to the user interface extension device, trusted relationship information for connecting the user interface extension device to the mobile communication device over the wireless link.

characterised by the vehicle further comprising an authentication code verification means for checking validity of an authentication code to restrain unauthorised use of the vehicle without a valid authentication code;

means for providing the user interface extension device with an identifier having a common source as the authorisation code; and the wireless transceiver being configured to establish the wireless link between the user interface extension device and a particular mobile communication device, by using the identifier.

Preferably, the vehicle is a car. Even more preferably, the vehicle is a passenger car. Alternatively, the vehicle may be a boat or an aircraft.

According to a fifth aspect of the present invention, there is provided a computer executable program to control a user interface extension device configured for vehicle use, for extending a user interface of a mobile communication device, comprising:

computer executable program code for causing the user interface extension device to provide a wireless link between the user interface extension device and the mobile communication device;

computer executable program code for causing the user interface extension device to provide the mobile communication device with an extended user interface;

computer executable program code for causing the user interface extension device to store trusted relationship information for connecting to the mobile communication device over the wireless link;

characterised by the program further comprising:
computer executable program code for causing the user interface extension device to receive an identifier having a common source as an authorisation code to use a vehicle, the identifier identifying a particular mobile communication device; and
computer executable program code for causing the user interface extension device to establish the wireless link between the user interface extension device and a particular mobile communication device by using the identifier.

The embodiments of one aspect also apply to various other aspects of the invention. In sake of briefness, the embodiments have not been repeated in connection with every aspect of the invention. A skilled reader will appreciate the advantages of the various aspects based on the advantages of the first aspect of the invention.

BRIEF DESCRIPTION OF THE DRAWINGS

The invention will now be described, by way of example only, with reference to the accompanying drawings, in which:

FIG. 2 shows a flow chart of the operation of the system of FIG. 1;

FIG. 3 shows the association process 242 of FIG. 2 in more detail; and FIG. 4 shows a correlation matrix of the preferred embodiment of the invention.

DETAILED DESCRIPTION

Figure 1:
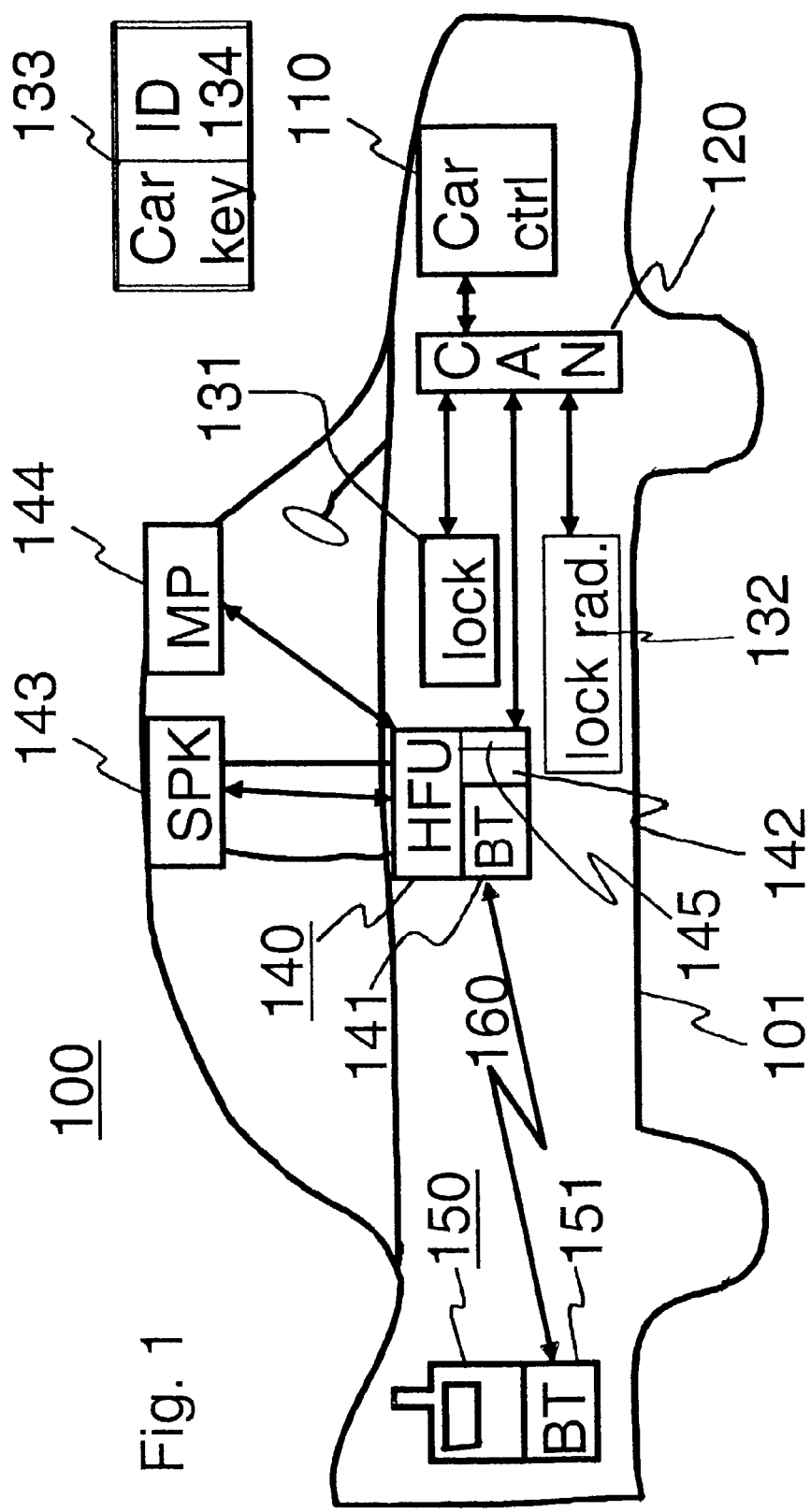
FIG. 1 shows a system according to a preferred embodiment of the invention.

FIG. 1 shows a system 100 according to a preferred embodiment of the invention. The system 100 is installed in a car 101. The system comprises a black box, or car controller 110, a Controller Area Network (CAN) 120 connected to the car controller 110, and a plurality of devices connected to the controller area network, including a lock 131, a lock radio 132 for receiving remote locking and unlocking commands, a hands free (HF) extension Unit HFU 140 and a mobile telephone 150. The HFU 140 comprises a Bluetooth (BT) module 141 for Low-Power Radio Frequency co-operation with Bluetooth enabled mobile telephones, a memory 142, a speaker 143, a microphone 144 and a port 145 for communicating with the CAN 120. The speaker 143 and the microphone 144 are user interface elements mounted on or embedded in an inner surface of the car 101 as is typical in the art of car HF sets for mobile telephones. In alternative embodiments, either or both of the speaker 143 and the microphone 144 may be integrated into an HF-set accessory that can be plugged into a cigarette lighter socket. The mobile telephone 150 comprises a Bluetooth module 151 compliant with the Bluetooth module 141 of the HFU 140.

When the driver comes to the car 101 when stopped and parked, he takes the key 133, opens a door (not shown) with the key 133, and switches an ignition voltage on using the key 133. The HFU 140 is installed such that it receives the car's battery voltage and is operable when ignition voltage is switched on. This connection provides clear logic that is easy to understand by a user (that is, a driver). the HFU 140 is on when the ignition voltage is switched on, and off when the ignition voltage is switched off. In an alternative embodiment, the HFU 140 becomes switched off with a delay if, upon switching the ignition voltage off, an HF conversation is going on. In yet another alternative embodiment, the HFU 140 is continuously operable and can be switched on and off separately from the ignition voltage.

The system 100 is configured so that the doors (not shown) of the car 101 can be locked either with a car key 133 or with a remote controller (not shown), using the lock radio 132. On opening a door or unlocking the steering lock, the lock 131 is configured to read the car key 133 and an identifier 134 associated to the car key 133 and to provide the identifier 134 to the CAN 120. Although the lock is drawn as a single unit, it typically has at least three different access elements, one for each front door and one for steering or gear-box locking. The car key is mechanical or electronic such as in Renault Laguna™ model (2001 version).

The CAN 120 is configured to pass to the HFU 140 information specific to the car key 133. This information may be the identifier 134 associated to the car key 133, or a derivative thereof. In this embodiment, the CAN 120 passes the identifier 134 associated with the car key 133 itself to the HFU 140. The operation of the system is described with reference to FIG. 2. In brief, when in operation, the HFU outputs and inputs electrical signals to and from the speaker 143 and the microphone 144.

The Bluetooth module 141 allows remote use of the HFU by the Bluetooth enabled mobile telephone 150 located, for example, in a boot of the car 101.

FIG. 2 shows a flow chart of the operation of the system of FIG. 1. The operation starts from step 210, in which the car 101 is in a passive state (for example, parked and locked). Next, the driver arrives at the car 101, and unlocks it using the car key 133. In step 220, the car key 133 is used to switch ignition voltage on and the HFU 140 becomes operative. In step 230, the driver's ID, or the identifier 134 related to the car key 133 of the driver, is passed from the lock 131 to the HFU 140 via the CAN 120. The HFU 140 next checks (step 241) whether it has already associated any mobile device such as the mobile telephone 150 with the identifier 134. If it has, the procedure skips steps up to 243. If it has not, in step 242 the HFU 140 attempts to associate one or more mobile telephones with the identifier 134. This association process is further described with reference to FIG. 3.

In step 243, the HFU 140 then searches among the associated mobile telephones for available mobile telephones associated with the identifier 134. A correlation matrix 400 (shown in FIG. 4) is stored and maintained in the memory 142 for determining the mobile telephone or mobile telephones associated with the identifier 134. The searching has two possible results. As a first result, there is only one such mobile telephone 150 and the HFU 140 attempts to connect with this mobile telephone 150. As a second result, there are more than one available associated mobile telephones and the HFU 140 attempts to connect with one of them. In this case, the HFU 140 attempts to connect with each of the available associated mobile telephone 150 in a predetermined order, until it succeeds in connecting with one mobile telephone 150 or all attempts have failed. This predetermined order is typically the order of recent usage of the mobile telephones with the HFU 140.

Although the identifier 134 is physically independent of the mobile communication device 150, that is it is kept in the car key 133 and is not even accessible to the mobile communication device 150, the mobile communication device 150 is identified by the identifier 134, because the driver at least temporarily is in possession of the car key 133. Therefore, common control by the driver creates an association between the identifier 134 and the mobile communication device 150.

In step 250, the HFU 140 checks whether an HF service has been or is being requested. If no HF service has been or is being requested, the operation jumps to step 270.

Assuming an HF service has been or is being requested, in step 260, the HFU 140 provides the service requested. It forms the Bluetooth link 160 with an associated mobile telephone 150 to provide the HF service requested, for example, by providing a loudspeaker and microphone service over the Bluetooth link 160 using the Bluetooth module 141.

In the preferred embodiment, the operation proceeds and cycles repeatedly through steps 241 to 270 or 280 during the providing the service requested. The service is thus started in step 260 and the process continues during the providing the service. In an alternative embodiment, the service requested is first provided entirely before proceeding to step 270.

In this preferred embodiment, the mobile communication device 150 has a voice recognition capability. Otherwise, in an alternative embodiment, steps 270 and 280 are omitted and the operation returns to step 241.

In step 270, the HFU 140 checks whether it has been ordered to receive a voice command from the driver. Such an order can be given by a voice command, for example, by pronouncing "HF command" if the HFU 140 has voice recognition functionality. In alternative embodiments, the order can be given by pressing a particular button (not shown) or by using the mobile telephone 150 over the Bluetooth link 160 (for example, using a menu command). If the order for receiving a voice command has been given, the operation proceeds to step 280.

If no order for receiving a voice command has been given, the operation returns to step 241. There the HFU 140 checks again for mobile telephones that are available, because the number of mobile telephones available may change during a journey, for example, due to switching a mobile telephone on or off.

In step 280, voice commanding is performed. The HFU 140 captures speech (or at least one word or phoneme) by the microphone 144 and transmits it over the Bluetooth link 160 to the mobile telephone 150. The mobile telephone 150 then performs voice recognition to recognise what the driver has commanded. After step 280, the operation resumes to step 241.

In this embodiment, the voice recognition has two phases, firstly initiating voice recognition by a first voice recognition command (the order) and secondly actually performing voice recognition of the actual message. These phases are next explained.

In the first phase, only an oral order for receiving a voice command is recognised by the HFU 140. For example, if the driver desires to call a friend "Laura", he or she first says "HF command". The HFU 140 recognises this order. It then starts preparing the mobile telephone for the second phase of the voice recognition by messaging over the Bluetooth link 160 to the mobile telephone 150 that oral signal will be captured by the microphone 144 and transmitted to the mobile telephone 150.

In the second phase, the mobile telephone carries out voice recognition on the oral signal which is transmitted to it over the Bluetooth link 160. In this case, the driver says "call Laura". The HFU 140 captures this oral signal and forwards it to the mobile telephone 150, which recognises as a command that a call should be made. The mobile telephone 150 further recognises the recipient or number to which the call should be made, in this case the name Laura. It then looks for its own phone book for this name, picks the corresponding telephone number and initiates a mobile telephone call to Laura's number. It also connects to the HFU 140 for an HF phone call and the driver can hear through the speaker 143 when the call is answered. At this point, if the mobile telephone 150 is able to detect answering of the phone call, the mobile telephone 150 commands the HFU 140 over the Bluetooth link 160 to silence through the CAN 120 a car radio (not shown) if such is installed. Correspondingly, when the telephone call is terminated, the mobile telephone 150 informs the HFU 140 that the telephone call has been terminated and the HFU 140 stops transmitting signals received by the microphone 144 over the Bluetooth link 160 and returns the car radio to its previous playing mode through the CAN 120.

In a further embodiment of the invention, voice recognition can be further used for inputting text messages spoken by the driver for transmission in a text form. Correspondingly, received text messages can be synthesised (back) to speech with a recipient's mobile telephone 150.

The two-phase operation described in the foregoing necessitates only limited voice recognition functionality from the HFU 140, as the mobile telephone 150 performs recognition of the actual command. Furthermore, different interpretation of commands is enabled depending on which mobile telephone 150 has been connected to the HFU 140, because the different mobile telephones have different phone books and may also have different capabilities.

FIG. 3 shows the association process 242 of FIG. 2 with more detail. The process starts from step 310, wherein the correlation matrix 400 (see FIG. 4) is empty, that is, the HFU 140 does not initially have any associations. Next, in step 320, the HFU 140 checks if it has received a pairing request from a mobile telephone 150. If no pairing request has been received, the association process 242 jumps to step 360 and ends there.

In step 330, if a pairing request has been received, a code (such as a 4-digit code known by the driver if he is a legitimate user of the HFU 140) is requested from the driver as an indication that his or her mobile telephone 150 should be trusted and paired with the HFU 140. In an alternative embodiment this code is presented by the HFU 140 so that only the people within the car 101 should have access to the code. Next, the code is inputted by the mobile telephone 150 from the driver.

In step 340, the code received in step 330 is transferred from the mobile telephone 150 to the HFU 140 over the Bluetooth link 160.

In step 350, the HFU 140 and the mobile telephone 150 are paired with each other, by using the code transferred in step 340, in a pairing process known from Bluetooth technology. This process involves steps in which the HFU 140 generates a code that can later be used to form session keys for securing the Bluetooth link 160 between the HFU 140 and the mobile telephone 150. The HFU 140 stores in its memory 142, in a record 410 of the correlation matrix, the identifier 134 and the code (typically in a non-volatile manner) and other data for later forming Bluetooth links 160 with the mobile telephone 150.

Typically, radio traffic between the HFU 140 and the mobile telephone 150 is encrypted using a session key that is derived from trusted relationship information stored as part of the pairing made in step 350.

In step 360, the association process 242 ends.

FIG. 4 shows the correlation matrix 400 of the preferred embodiment of the invention. The correlation matrix 400 is a dynamically sizeable matrix that is able to contain a plurality of records 410. Each record comprises the following data fields: an identifier field 411, a pairing data field 412 and a priority field 413. The identifier field 411 comprises an identifier (such as the identifier 134). The pairing data field comprises the pairing data for one mobile telephone (such as the mobile telephone 150). The priority field comprises data for selecting an order in which to select one mobile telephone if different mobile telephones are associated with the same identifier, that is, if the correlation matrix 400 comprises two records having the same data in the identifier data field 411. Typically, the priority data field comprises a time stamp showing the time when the use of the mobile telephone ended.

The use of the correlation matrix is next briefly explained. For example, if the correlation matrix 400 comprises more than one data field with the same identifier field 411 content (that is, more than one mobile telephone is associated with the same car key), the HFU 140 determines which record 410 to use by looking for the most recent time stamp in the priority field 413. The pairing data of that record 410 will then be used in selecting the mobile telephone associated with this most recent time stamp and a connection is attempted to this mobile telephone if it is available.

To summarise the foregoing description of the preferred embodiment of the invention, the HFU 140 provides automatic reconfiguration of the system 100. Some of the system's functional elements are chosen among different alternatives (mobile telephones). The system helps the driver to more easily access his or her mobile telephone 150, even if the same car 101 accommodates other mobile telephones that also earlier have been connected to the same HFU 140. This particularly applies when the mobile telephones are each associated with different car keys 133. The system 100 allows performing various operations (by using voice recognition and the Bluetooth link 160) with the mobile telephone 150 associated with the driver's identifier 134 without the driver needing to physically access it.

The invention may further be enhanced by providing an automatic user interface control resuming to the mobile telephone 150 when the car key 133 is removed from the lock, or key reader in general. This allows automatic recognising when the driver leaves the car and consecutive moving of any active call from the HFU 140 to the mobile telephone 150. Using this embodiment, a user may step out his or her car and continue a mobile telephone call using the mobile telephone. By removing the car key 133 from the lock user simultaneously immobilises the car and indicates termination of the user of the HFU 140. Technically, this is typically implemented by sending an indication of the removal of the car key 133 over a bus in the car (e.g. CAN) and detecting this indication by the HFU 140. Using this information, the HFU can smoothly disconnect the current Bluetooth link 160 according to the BT protocol. When the link is disconnected, the radio telephone 133 will automatically re-route the call to its own user interface. For user feedback, an indication of the re-routing of the call is advantageously provided by the HFU 140, for example, by speech synthesis or displayed message.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

The invention claimed is:

1. A method comprising:
   storing, accessible to a user interface extension device of a vehicle, trusted relationship information for connecting to a mobile communication device over a wireless communication link, the trusted relationship information associating at least one piece of authorization information with at least one mobile communication device;
   receiving authorization information from a control network of the vehicle in response to the control network receiving valid authorization for using the vehicle, wherein the control network receives the valid authorization from a source;
   checking whether the stored trusted relationship information includes an association between the received authorization information and at least one mobile communication device; and
   in case of an existing association, establishing, based on the trusted relationship information, a wireless communication link with a mobile communication device of the at least one mobile communication device associated with the received authorization information, wherein the source is other than the mobile communication device.

2. A method according to claim 1, wherein the authorization information comprises an identifier.

3. A method according to claim 2, wherein the trusted relationship information corresponds to the identifier.

4. A method according to claim 3, further comprising keeping a database comprising the trusted relationship information and the corresponding identifier.

5. A method according to claim 1, further comprising detecting a pairing request from the mobile communication device within radio coverage of the user interface extension device.

6. A method according to claim 1, wherein the user interface extension device further comprises a memory and the method further comprises associating the trusted relationship information with the authorization information, and wherein associating further comprises storing trusted relationship information in the memory.

7. A method according to claim 1, wherein said trusted relationship information is suitable for use in a pairing process conforming to the Bluetooth standard.

8. A method according to claim 1, wherein the user interface extension device further comprises at least one of a loudspeaker, a microphone, a display, an electronic image capturing device and a speech synthesizing device.

9. A method according to claim 1, further comprising deriving the valid authorization for using the vehicle from a physical entity, the physical entity being selected from a group comprising: a mechanical key, an electronic key, a retinal pattern of a user, a finger print of a user, and a voice of a user.

10. A method according to claim 1, further comprising automatically transferring user interface operation from the user interface extension device to the mobile communication device associated with the received authorization information in response to detecting the authorization information becoming inaccessible to the vehicle.

11. A method according to claim 1, further comprising storing priority information in a memory, and selecting a mobile communication device based on the priority information, when several mobile communication devices have been associated with a piece of authorization information.

12. A user interface extension device, comprising:
   a wireless transceiver for providing a wireless communication link between a user interface extension device and a mobile communication device;
   a memory for storing trusted relationship information for connecting to the mobile communication device over the wireless communication link, the trusted relationship information associating at least one piece of authorization information with at least one mobile communication device; and a port for receiving authorization information from a control network of a vehicle in response to the control network receiving valid authorization for using the vehicle, wherein the control network receives the valid authorization from a source;

wherein the user interface extension device has been configured to check whether the stored trusted relationship information in the memory includes an association between the received authorization information and at least one mobile communication device; and wherein the wireless transceiver has been configured to establish, based on the trusted relationship information, a wireless communication link with a mobile communication device of the at least one mobile communication device associated with the received authorization information in case of an existing association, wherein the source is other than the mobile communication device.

13. A user interface extension device according to claim 12, wherein the user interface extension device further comprises at least one of a loudspeaker, a microphone, a display, an electronic image capturing device or a speech synthesizing device.

14. A user interface extension device according to claim 12, wherein the memory is configured to store priority information, and the user interface extension device is configured to select a mobile communication device based on the priority information, when several mobile communication devices have been associated with a piece of authorization information.

15. A system comprising:

a mobile communication device comprising a wireless transceiver for forming a wireless communication link;

a user interface extension device comprising a wireless transceiver for providing a wireless communication link between the user interface extension device and a mobile communication device;

a memory for storing, accessible to the user interface extension device, trusted relationship information for connecting the user interface extension device to the mobile communication device over the wireless communication link, the trusted relationship information associating at least one piece of authorization information with at least one mobile communication device; and a port for receiving authorization information from a control network of a vehicle in response to the control network receiving valid authorization for using the vehicle, wherein the control network receives the valid authorization from a source;

wherein the user interface extension device has been configured to check whether the stored trusted relationship information in the memory includes an association between the received authorization information and at least one mobile communication device; and wherein the wireless transceiver has been configured to establish, based on the trusted relationship information, a wireless communication link with a mobile communication device of the at least one mobile communication device associated with the received authorization information in case of an existing association, wherein the source is other than the mobile communication device.

16. A vehicle comprising:

a user interface extension device configured for vehicle use;

a wireless transceiver for providing a wireless communication link between the user interface extension device and a mobile communication device;

a memory for storing, accessible to the user interface extension device, trusted relationship information for connecting the user interface extension device to the mobile communication device over the wireless communication link, the trusted relationship information associating at least one piece of authorization information with at least one mobile communication device;

an authorization verification unit for checking validity of authorization to restrain unauthorized use of the vehicle without valid authorization, wherein the authorization verification unit receives the valid authorization from a source; and a control network for providing the user interface extension device with authorization information in response to the authorization verification unit receiving the valid authorization;

wherein the user interface extension device has been configured to check whether the stored trusted relationship information in the memory includes an association between the received authorization information and at least one mobile communication device; and wherein the wireless transceiver has been configured to establish, based on the trusted relationship information, a wireless communication link with a mobile communication device of the at least one mobile communication device associated with the received authorization information in case of an existing association, wherein the source is other than the mobile communication device.

* * * * *